United States Patent
Steiger et al.

(10) Patent No.: US 7,301,980 B2
(45) Date of Patent: *Nov. 27, 2007

(54) HALOGEN GAS DISCHARGE LASER ELECTRODES

(75) Inventors: Thomas D. Steiger, San Diego, CA (US); Richard C. Ujazdowski, Poway, CA (US); Timothy S. Dyer, Auburn, CA (US); Thomas P. Duffey, San Diego, CA (US); Walter D. Gillespie, Poway, CA (US); Bryan G. Moosman, San Marcos, CA (US); Richard G. Morton, San Diego, CA (US); Brian D. Strate, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 10/877,737

(22) Filed: Jun. 25, 2004

(65) Prior Publication Data

US 2005/0047471 A1    Mar. 3, 2005

Related U.S. Application Data

(60) Continuation-in-part of application No. 10/672,722, filed on Sep. 26, 2003, which is a continuation-in-part of application No. 10/672,182, filed on Sep. 26, 2003, and a continuation-in-part of application No. 10/672,181, filed on Sep. 26, 2003, and a continuation-in-part of application No. 10/638,247, filed on Aug. 7, 2003, which is a continuation-in-part of application No. 10/629,364, filed on Jul. 29, 2003, which is a division of application No. 10/104,502, filed on Mar. 22, 2002, now Pat. No. 6,690,706.

(51) Int. Cl.
*H01S 3/097* (2006.01)

(52) U.S. Cl. .......................................... 372/87; 372/55

(58) Field of Classification Search ................. 372/55, 372/87
See application file for complete search history.

(56) References Cited

U.S. PATENT DOCUMENTS 4,245,194 A    1/1981    Fahlen et al. .............. 331/94.5

(Continued)

FOREIGN PATENT DOCUMENTS

JP    2631607    7/1997

OTHER PUBLICATIONS

Nguyen, Thinh, et al., "Diffusion Bonding—An Advanced Material Process for Aerospace Technology", http://www.vacets.org/vtic97/ttnguyen.htm.

*Primary Examiner*—Dung (Michael) T. Nguyen
(74) *Attorney, Agent, or Firm*—William Cray

(57) ABSTRACT

A gas discharge laser includes a laser chamber containing a halogen laser gas, two electrode elements defining a cathode and an anode, each having a discharge receiving region defining two longitudinal edges and having a region width defining a width of an electric discharge between the electrode elements in the laser gas. The anode comprising a first anode portion comprising a first anode material defining a first anode material erosion rate, located entirely within the discharge receiving region, a pair of second anode portions comprising a second anode material defining a second anode material erosion rate, respectively located on each side of the first anode portion and at least partially within the discharge receiving region; an electrode center base portion integral with the first anode portion; and wherein each of the respective pair of second anode portions is mechanically bonded to the center base portion.

82 Claims, 10 Drawing Sheets

U.S. PATENT DOCUMENTS

| | | | |
|---|---|---|---|
| 4,414,488 A | 11/1983 | Hoffmann et al. | 315/39 |
| 4,546,482 A | 10/1985 | Bagaglia et al. | 372/86 |
| 4,547,886 A | 10/1985 | Kaminski et al. | 372/59 |
| 4,686,682 A | 8/1987 | Haruta et al. | 372/87 |
| 4,703,490 A | 10/1987 | Brumme et al. | 372/86 |
| 4,774,714 A | 9/1988 | Javan | 372/109 |
| 4,876,693 A | 10/1989 | Lucero et al. | 372/82 |
| 4,959,840 A | 9/1990 | Akins et al. | 372/57 |
| 5,070,513 A | 12/1991 | Letardi | 372/83 |
| 5,187,716 A | 2/1993 | Haruta et al. | 372/57 |
| 5,247,534 A | 9/1993 | Muller-Horsche | 372/58 |
| 5,359,620 A | 10/1994 | Akins | 372/58 |
| 5,535,233 A | 7/1996 | Mizoguchi et al. | 372/87 |
| 5,557,629 A | 9/1996 | Mizoguchi et al. | 372/87 |
| 5,586,134 A | 12/1996 | Das et al. | 372/38 |
| 5,763,930 A | 6/1998 | Partlo | 250/504 |
| 5,771,258 A | 6/1998 | Morton et al. | 372/57 |
| 5,818,865 A | 10/1998 | Watson et al. | 372/86 |
| 5,897,847 A | 4/1999 | Jursich et al. | 423/219 |
| 6,038,055 A | 3/2000 | Hansch et al. | 359/279 |
| 6,690,706 B2 * | 2/2004 | Morton et al. | 372/87 |
| 6,810,061 B2 * | 10/2004 | Hori et al. | 372/87 |
| 2003/0012234 A1 | 1/2003 | Watson et al. | 372/25 |
| 2003/0031216 A1 | 2/2003 | Fallon et al. | 372/29.01 |
| 2003/0138019 A1 | 7/2003 | Rylov et al. | 372/58 |
| 2004/0022292 A1 * | 2/2004 | Morton et al. | 372/55 |
| 2004/0037338 A1 * | 2/2004 | Morton et al. | 372/55 |
| 2004/0066827 A1 * | 4/2004 | Steiger et al. | 372/87 |
| 2004/0071178 A1 * | 4/2004 | Dyer et al. | 372/87 |
| 2004/0165638 A1 * | 8/2004 | Morton et al. | 372/55 |

* cited by examiner

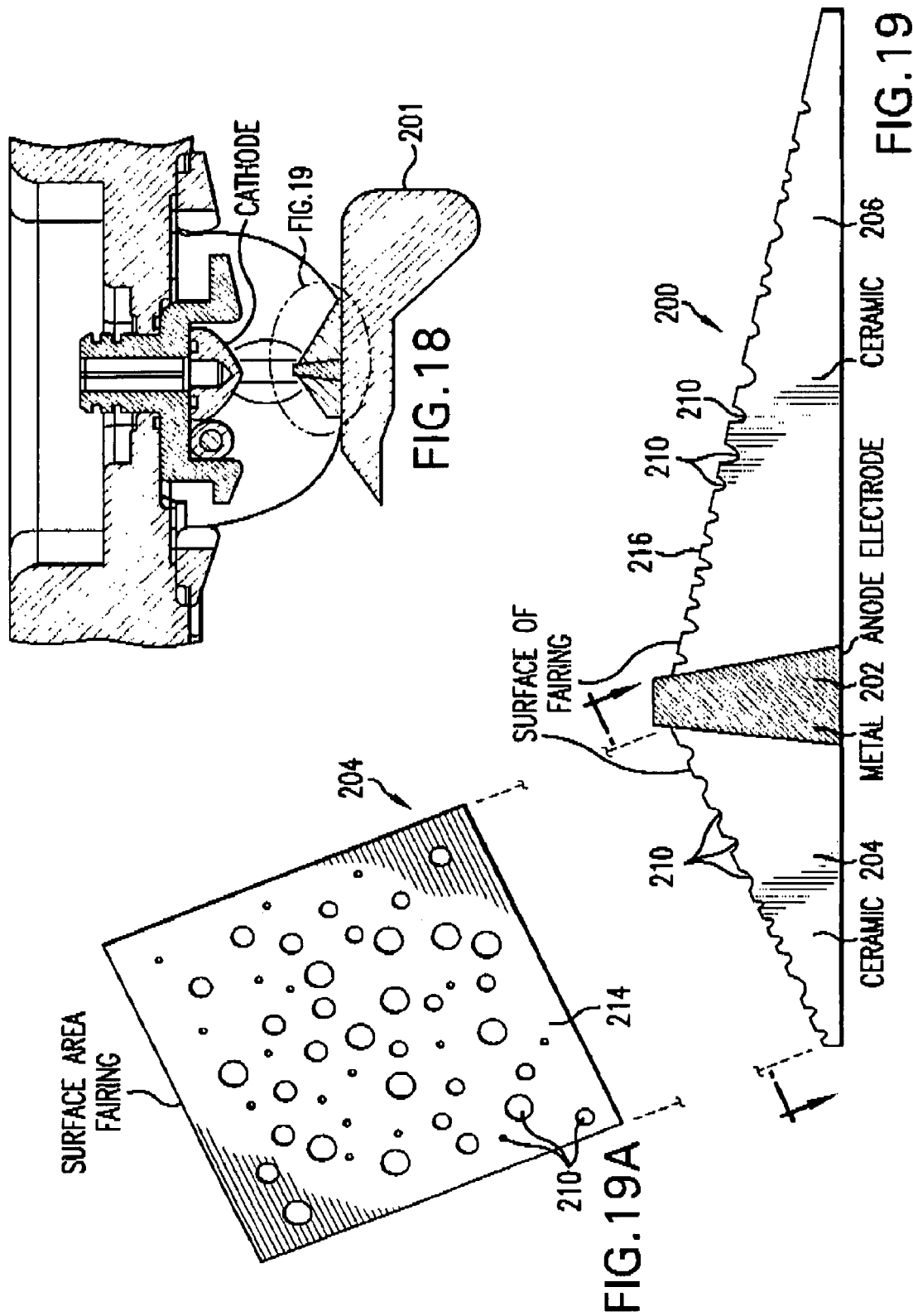

HALOGEN GAS DISCHARGE LASER ELECTRODES

RELATED APPLICATIONS

The present application is a continuation-in-part of U.S. patent application Ser. No. 10/629,364, entitled HIGH REP-RATE LASER WITH IMPROVED ELECTRODES, filed on Jul. 29, 2003, which is a Divisional of U.S. patent application Ser. No. 10/104,502, entitled HIGH REP-RATE LASER WITH IMPROVED ELECTRODES, filed on Mar. 22, 2002, (now U.S. Pat. No. 6,690,706, issued on Feb. 10, 2004, and a continuation-in-part of U.S. patent application Ser. No. 10/638,247, entitled HIGH REP-RATE LASER WITH IMPROVED ELECTRODES, filed on Aug. 7, 2003 as a continuation of the '502 application, each of which is assigned to applicants' common assignee, and the disclosures of each of which is hereby incorporated by reference. The present application is also a continuation-in-part of U.S. patent applications Ser. Nos. 10/672,722, entitled ANODES FOR FLUORINE GAS DISCHARGE LASERS, filed on Sep. 26, 2003, Ser. No. 10/672,181, entitled CATHODES FOR FLUORINE GAS DISCHARGE LASERS, filed on Sep. 26, 2003, and 10/672,182, entitled ELECTRODES FOR FLOURINE GAS DISCHARGE LASERS, filed on Sep. 26, 2003, each of which is assigned to applicant' common assignee, and the disclosures of each of which are hereby incorporated by reference.

FIELD OF THE INVENTION

The present invention relates to high repetition rate, high power, gas discharge laser light source electrodes.

BACKGROUND OF THE INVENTION

Electrodes of the type discussed in the above referenced patent and patent applications are well known for use in the art of providing light at small wavelengths, e.g., UV and DUV, i.e., below about 500 nm, using halogen based gas discharge media within an enclosed chamber and providing the gas discharge between a pair of electrodes at very high voltages, e.g., tens of thousands of volts and high amperage, e.g., hundreds of amps, in very short duration electrical discharges in the medium, e.g., tens of nanoseconds. This pulsed laser light is used for a variety of industrial purposes, e.g., in integrated circuit photolithography to expose photoresist on wafers by passing the light through a mask (reticle) to accomplish the desired exposure. The stability of various parameters of the light delivered to the wafer as provided by the laser light source is critical to proper performance of the manufacturing process, e.g., the proper exposure of the photoresist to define microscopic patterns on the wafer for manufacturing integrated circuits with critical dimensions measured in under 0.1 microns.

One aspect of this criticality of the maintenance of the stability of the light delivered is the maintenance of the stability, pulse-to-pulse and over long periods of operation, measured in tens of billions of pulses, of the electrodes. The above referenced patent and patent applications discuss various aspects of the geometries, materials and the like utilized for such electrodes. Applicants have developed aspects of electrode materials and geometries and structures aimed at increasing the discharge stability pulse to pulse and over life and at increasing useful life during which such stable pulses can continue to be provided in order to improve the efficiency and economic of operating such laser light source systems as will be explained in more detail below.

Applicants have noticed an end wear region of the discharge receiving region of electrodes generally just beyond where the electrodes being used by applicant' assignee in laser systems begin a roll-off toward an end portion of the electrodes, wherein, e.g., the erosion causes the discharge to widen somewhat at the end which hastens end of life for the electrode. Applicants herein propose certain aspects of embodiments of the present invention that will alleviate this end of life syndrome for electrodes.

SUMMARY OF THE INVENTION

A method and apparatus for operating a gas discharge laser is disclosed which may comprise a laser chamber containing a laser gas, the laser gas comprising a halogen, two elongated electrode elements defining a cathode and an anode, each of the cathode and anode having an elongated discharge receiving region having a discharge receiving region width defining a width of an electric discharge between the electrode elements in the laser gas, the discharge receiving region defining two longitudinal edges, and the anode comprising: a first elongated anode portion comprising a first anode material defining a first anode material erosion rate, located entirely within the discharge receiving region of the anode, a pair of second elongated anode portions comprising a second anode material defining a second anode material erosion rate, respectively located on each side of the first anode portion and at least partially within the discharge receiving region; an elongated electrode center base portion integral with the first elongated anode portion; and wherein each of the respective pair of second elongated anode portions is mechanically bonded to the center base portion. The electrode element may comprise a cathode. The first and second materials may be different materials such as different brass alloys with different erosion rates in the halogen gas. The first elongated cathode portion may comprise a first cathode material, located entirely within the discharge receiving region comprising a first portion of an ellipse intersecting elongated side walls, with a bottom wall opposite the portion of the ellipse; and a pair of second elongated cathode side portions comprising a second cathode material with the intersection of each respective second cathode portion and the portion of the ellipse forming the discharge receiving region of the first cathode portion, forming respective ellipsoidal extensions of the first portion. The members may be mechanically bonded to the center base portion. Some may be diffusion bonded to the center base portion and/or each other. The electrode assembly may have a hooded discharge receiving region extension at respective ends of the electrode and the electrode portion may be formed with or bonded to the center base portion and may have slanted side walls.

BRIEF DESCRIPTION OF THE DRAWINGS

FIG. 18 shows a cross sectional view of a portion of a laser chamber showing an anode and a cathode;

FIGS. 19 and 19A show a cross-sectional and plan view respectively of a partly schematic view of aspects of an embodiment of the present invention.

DETAILED DESCRIPTION OF PREFERRED EMBODIMENTS

Figure 1:
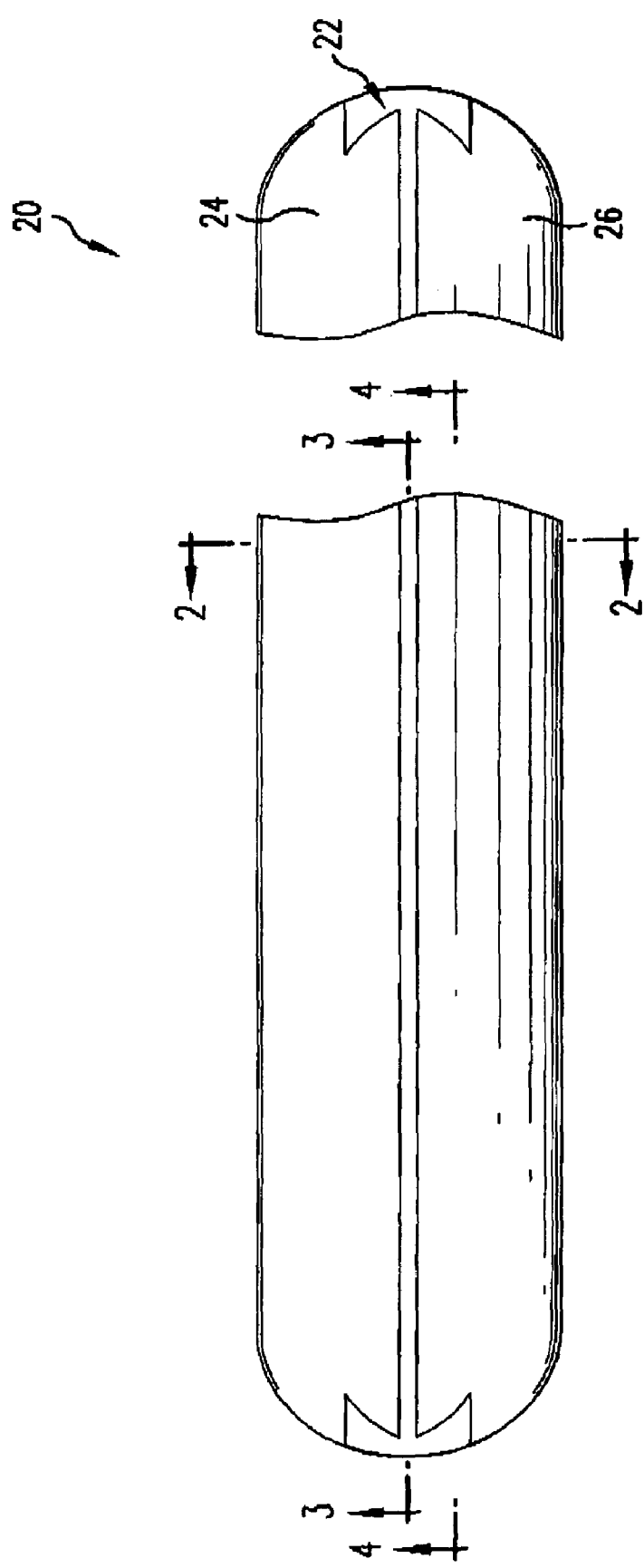
Turning now to FIG. 1 there is shown a top plan partially cut-away view of an electrode assembly 20 according to an aspect of an embodiment of the present invention.

FIG. 1 shows a top plan partially cut-away view of an electrode assembly 20 according to an aspect of an embodiment of the present invention. The electrode assembly 20 may have an elongated center base portion 22 made of a first material, e.g., a relatively low erosion rate brass alloy as discussed in the above referenced 706 patent, such as, e.g., C26000 brass, and a first elongated side portion 24 and a second opposing elongated side portion 26 each made of a second material, e.g., an alloy of relatively higher erosion rate, such as, e.g., a C36000 brass. It will be understood that erosion rate is meant to mean that erosion which is caused due to the environment within the medium, e.g., the presence of highly ionized fluorine atoms during and after the electric discharge between the electrodes of a gas discharge laser, and the position of the electrode as an anode or cathode, and other such factors, e.g., the time during the discharge and the direction of flow of current through the medium between the electrodes, the voltage extant at any given time, etc. The erosion rate for a given material being an average erosion rate over a life time for an electrode or pair of electrodes due to continuous exposure to the just mentioned environmental factors. It being understood that over time a given material may erode faster on an electrode than on a cathode, i.e., the anode, where, e.g., the center base portion 22 may be made of C36000 and the side portions of C26000.

Figure 2:
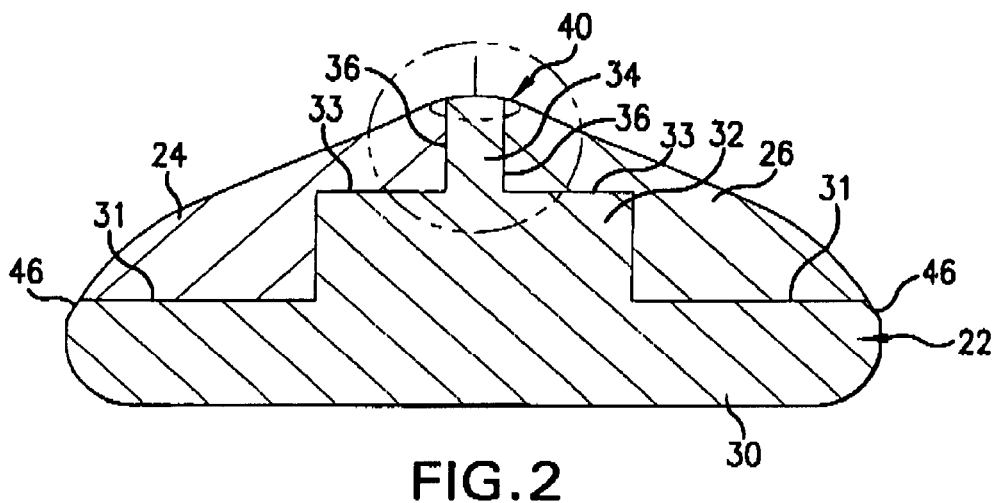
FIG. 2 shows a cross-sectional view of the embodiment of FIG. 1 taken along the cross-sectional lines 2—2 in FIG. 1.

Turning now to FIG. 2 there is shown a cross-sectional view of the embodiment of FIG. I taken along the cross-sectional lines 2—2 in FIG. 1. As shown in FIG. 2, the electrode assembly 20 may include a center base portion lower portion 30, forming a pair of shelves 31, a center base portion intermediate portion 32 forming a pair of shelves 33 and a center base portion upper portion 34 which may have a pair of opposing side walls 36. It will be understood that the center base portion may extend essentially for the entire longitudinal length of the electrode assembly 20 and may look as shown in perspective view in FIG. 5, prior to some finishing processing steps, e.g., a machining process. Also as shown in FIG. 2 the first and second side portions 24, 26 may be configured to abut the shelves 31 of the lower center base portion 30, and 33 of the intermediate center base portion 32 and the side walls 36 of the upper center base portion 34.

Figure 2A:
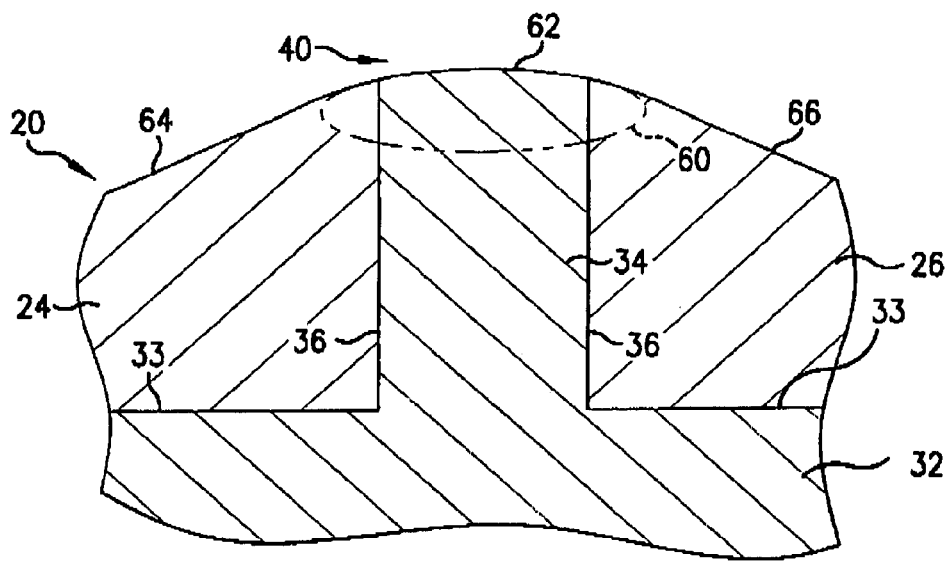
FIG. 2A shows a detail of FIG. 1 contained in the circle shown in FIG. 1.

Turning now to FIG. 2A, there is shown a detail from FIG. 1 contained within the circle shown in FIG. 1. FIG. 2A shows that the facing portion of the electrode assembly 20, which faces an opposing electrode may comprise a discharge receiving region 40, which extends longitudinally along the electrode assembly 20. The facing portion 62 of the upper center base portion 34 of the electrode assembly 20 may comprise a portion of an ellipse 60, e.g., a portion of one half of the ellipse 60. In addition as shown in FIG. 2A according to an aspect of an embodiment of the present invention, the upper facing surfaces of the respective opposing side portions 24, 26 on either side of the upper center base portion 34 may contain respective ellipsoidal portions that essentially form an extension of the portion of the ellipse 60 forming the facing portion 62 of the upper portion 34 of the center base portion 22 extending on either side of the facing portion 62 ellipsoidal surface. It will be understood that according to aspects of an embodiment of the present invention the discharge receiving region 40 of the electrode assembly 20 may be essentially coextensive with the ellipsoidal surface formed by both the facing portion 62 of the upper portion 34 of the center base portion 22 and the ellipsoidal extensions formed in the respective opposing portions of the side portions 24, 26. Thus according to an aspect of an embodiment of the present invention an elongated discharge receiving region 40 extends substantially the length of the electrode assembly 20 formed by the ellipsoidal surface formed by the facing portion 62 of the upper portion 34 f the center base portion and the adjoining ellipsoidal surfaces of the opposing side portions 24, 26 along the respective edges of the facing portion 62 of the upper portion 34. It will also be understood as is also shown in FIG. 2A, that the discharge receiving region 40 is not completely the top half of an ellipse 60, either because the discharge, according to one aspect of an embodiment of the present invention, extends partly into the generally flat upper surfaces 64,66 of the respective side portions 24, 26, or according to another aspect of an embodiment of the present invention, remains on the combined ellipsoidal surface, but, as shown, that ellipsoidal surface is not the complete half of the ellipse 60.

Figure 3:
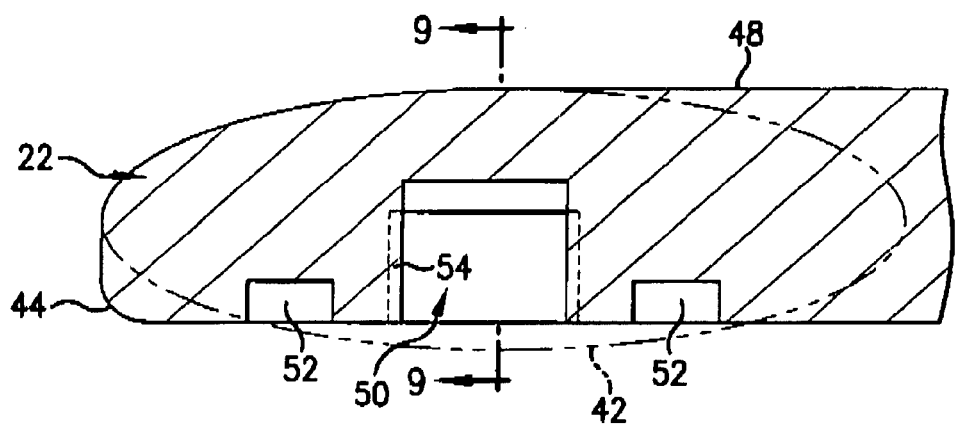
FIG. 3 shows a cross-sectional view of the embodiment of FIG. 1 along the cross-sectional lines 3—3 of FIG. 1.
Figure 4:
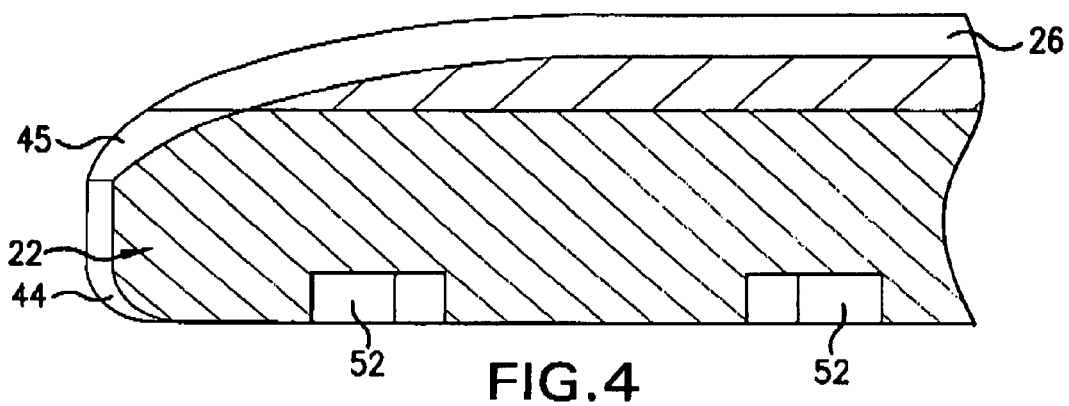
FIG. 4 shows a cross-sectional view of the embodiment of FIG. 1 along the cross-sectional lines 4—4 in FIG. 1.

Turning now to FIG. 3 there is shown a cross-sectional view of the embodiment of FIG. 1 along the cross-sectional lines 3—3 of FIG. 1. As shown in FIG. 3, the electrode assembly 20 center base portion 22, according to aspects of an embodiment of the present invention in longitudinal cross section may have a generally flat elongated portion 48 that may be rounded toward the end of the electrode assembly 20, e.g., in the shape of a portion of an ellipse 42. Turning now to FIG. 4 there is shown a cross-sectional view of the embodiment of FIG. 1 along the cross-sectional lines 4—4 in FIG. 1. FIG. 4 shown that the lower portion 30 of the center base portion 22 of the electrode assembly may be formed into an upper curved skirt portion 45 at the end of the electrode assembly and a lower curved skirt portion 44 also at the end of the electrode assembly. Also shown is that the respective side portions 24, 26 (only 26 being shown in FIG. 4) may be formed to smoothly follow the contour of the upper skirt portion 45 and vice-versa.

Figure 5:
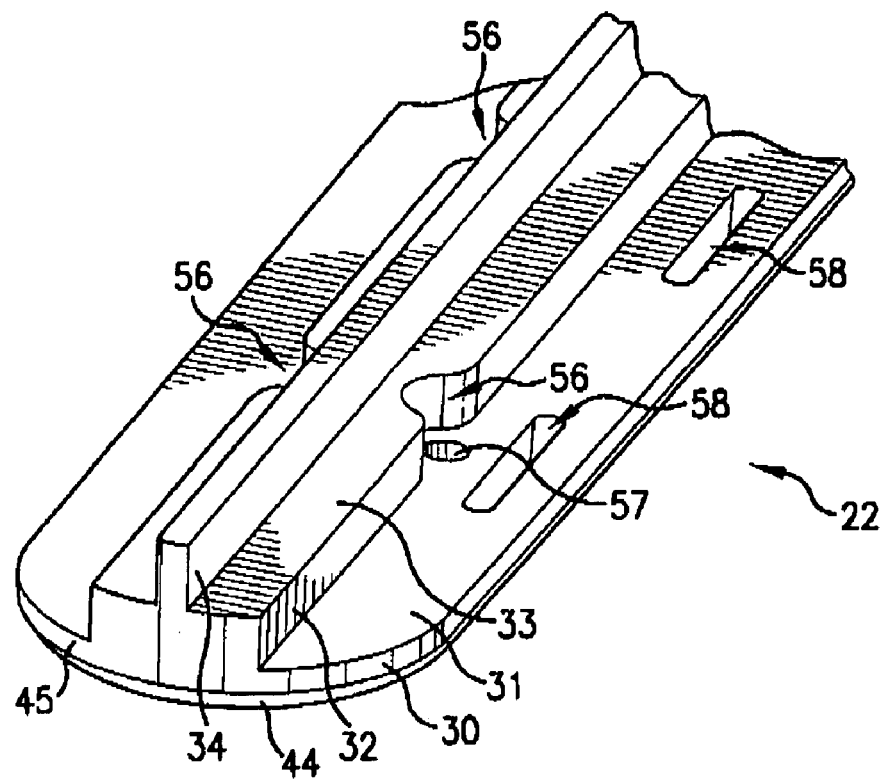
FIG. 5 shows a perspective view of one end of a central base portion of an electrode assembly according to aspects of an embodiment of the present invention shown in FIG. 1.

Turning now to FIG. 5 there is shown a perspective view of one end of the center base portion 22 of an electrode assembly 20 according to aspects of an embodiment of the present invention shown in FIG. 1. FIG. 5 shown that in the first shelf 31 of the lower portion 30 and corresponding vertical side walls of the intermediate portion 32 may be formed nooks 56, which may also contain an opening 57, e.g., for a bolt 80 (shown in FIG. 10 or an alignment dowel 96 (also shown in FIG. 10)., which may be formed, e.g., intermediate high voltage connecting rod opening 50 (shown, e.g., in FIGS. 3, 8 and 9) formed in the bottom portion 30 and intermediate portion 32 of the center base portion 22.

Figure 6:
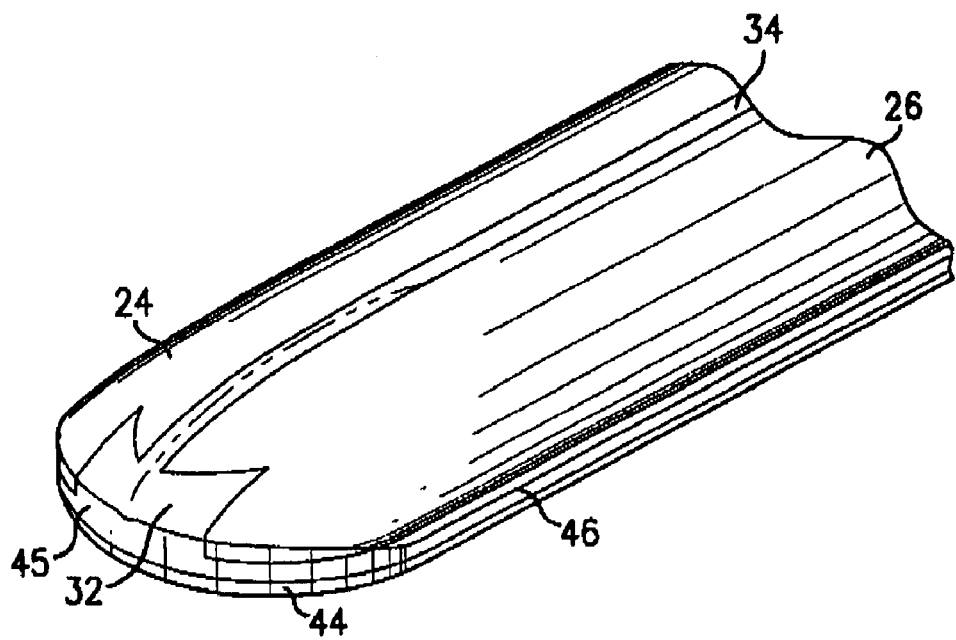
FIG. 6 shows a perspective view of an end of an electrode assembly according to aspects of an embodiment of the invention shown in FIG. 1.

Turning now to FIG. 6 there is shown a perspective view of an end of an electrode assembly 20 according to aspects of an embodiment of the invention shown in FIG. 1. As shown in FIG. 6 the side members 24 and 26 and the center base portion 22 may be machined, e.g., from a starting center base portion as illustrated in FIG. 5 and starting side portions as illustrated by the starting blocks 90, 92 shown in FIGS. 10 and 11, to form the end portion of an electrode assembly 20. also shown in FIG. 6 is a gradual roll-off of the electrode assembly facing surfaces on the upper base portion 34 and side portions 24, 26 with the end of the actual discharge receiving region of the electrode assembly 20 ending shortly, e.g., about one eighth of an inch from the beginning of the roll-off at the end portions of the electrode assembly 20. This is about where towards end of life for such electrode assemblies, whether multimember or machined, from a single piece of metal or diffusion bonded piece of metal as discussed in the above referenced co-pending applications and patent, the erosion toward the longitudinal ends of the discharge receiving region causes the discharge to widen at the ends with undesirable effects on the laser output beam parameters necessitating electrode replacement.

Figure 7:
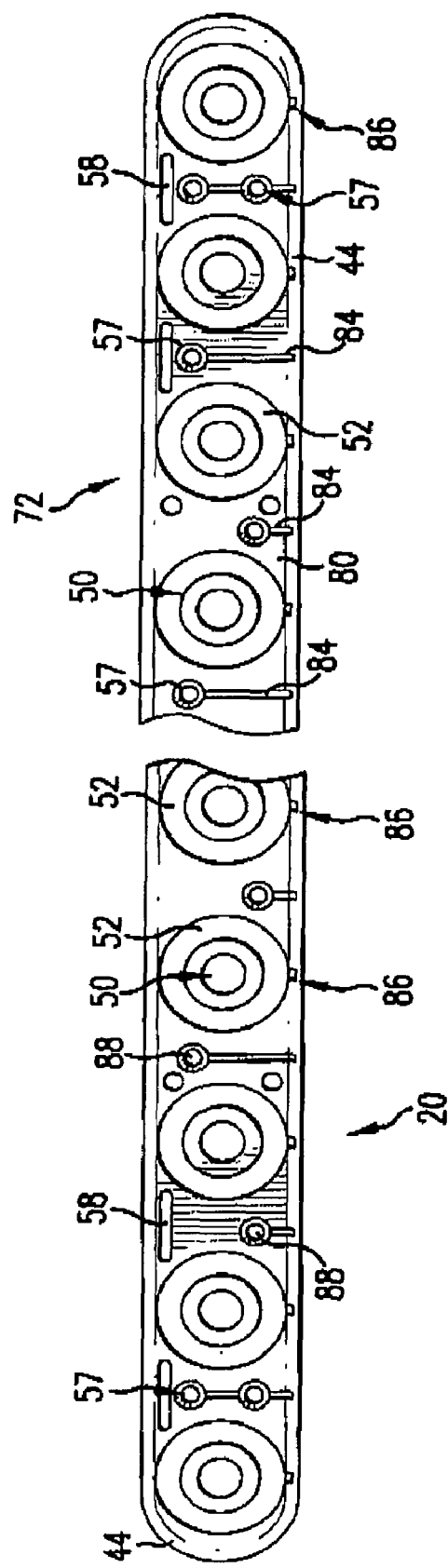
FIG. 7 shows a partially cut-away plan view of the bottom on an electrode assembly according to aspects of an embodiment of the present invention.
Figure 8:
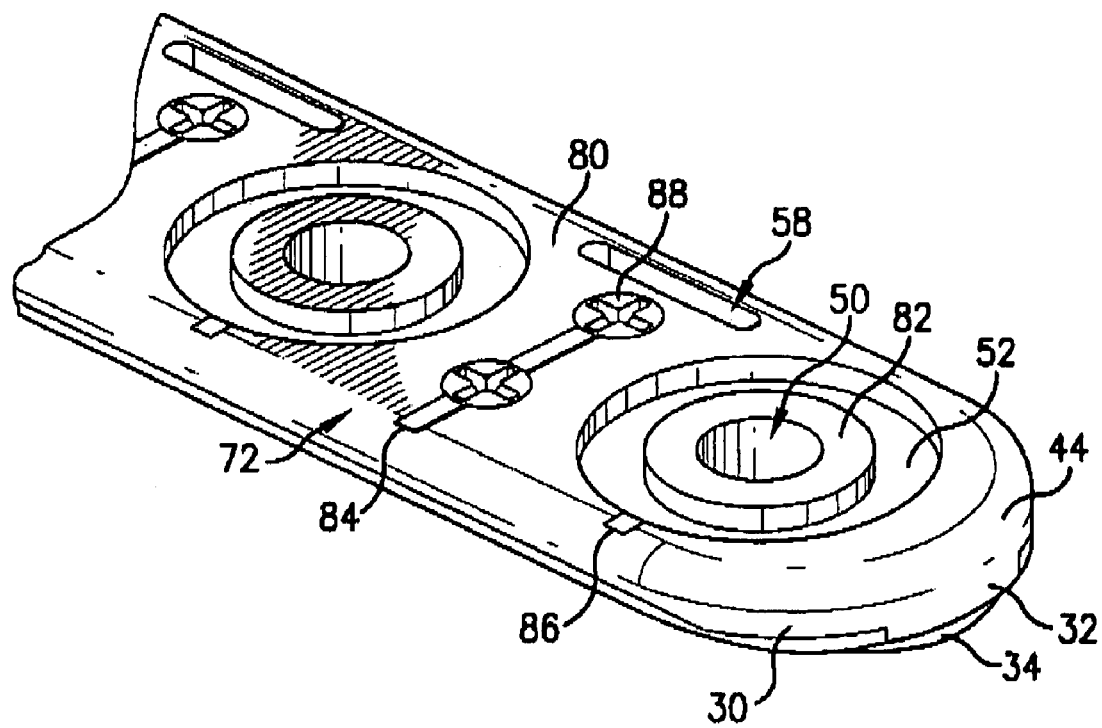
FIG. 8 shows a perspective view of an electrode assembly according to the embodiment of FIG. 1 viewed from the bottom.
Figure 9:
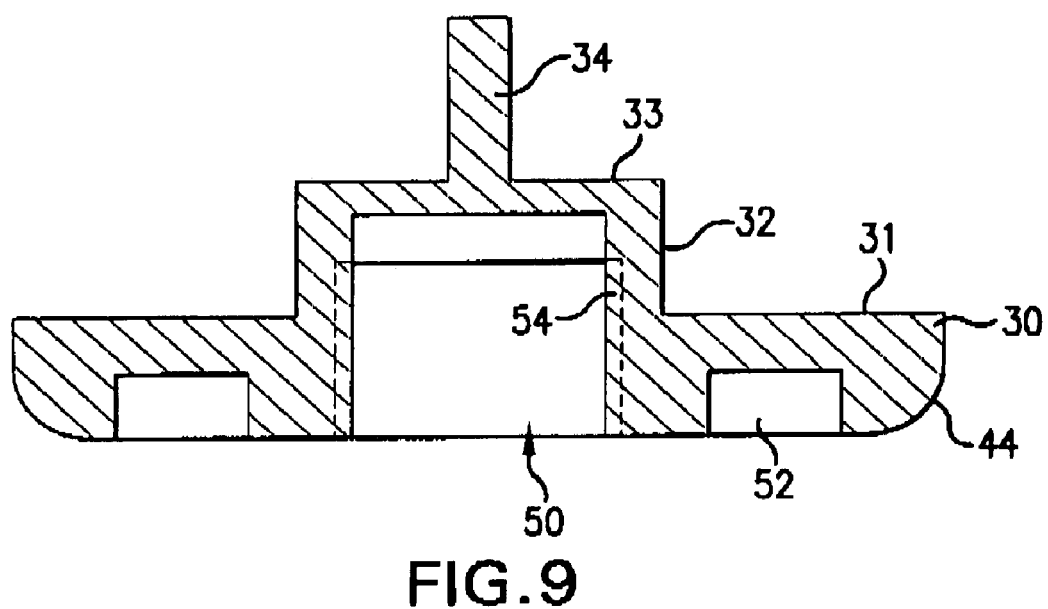
FIG. 9 shows a cross-sectional view of a center base portion taken along cross-sectional lines 9—9 in FIG. 3

Turning Now to FIG. 7 shows a partially cut-away plan view of the bottom on an electrode assembly according to aspects of an embodiment of the present invention. As shown in FIG. 7 the bottom 72 of the lower center portion 30 has a generally flat bottom surface 80 with a number of high voltage feed through rod well 50 machined into it as are also shown in FIGS. 3, 8 and 9. Also shown in FIG. 7 is the plurality of high voltage feed through well ledges 82 surrounding the respective wells 50 and intermediate the well 50 and vacuum seal grooves 52, also illustrated in FIG. 3, 8, 9 and 16. Also illustrated in FIGS. 7 and 8 are a plurality of bolt holes 57, which may be recessed. As is also shown in FIGS. 7 and 8 grooves 84 and 86 formed in the bottom 72 allow for the assurance that when the chamber is pumped down to a vacuum to, e.g., remove contaminants from the chamber there is not a slow pressure release after the chamber is sealed from the seal groves 52 of the recesses of the bolt holes 57.

Turning now to FIG. 8 there is shown a perspective view of an electrode assembly according to the embodiment of FIG. 1 viewed from the bottom, and as has been discussed above, shown in some more detail in FIG. 8 are the preionizing tube shim holding openings 58 which allow electrical contact with high voltage for the shim (not shown) that forms one plate of a capacitive corona discharge preionizer tube as is known in the art.

Turning now to FIG. 9 there is shown a cross-sectional view of a center base portion taken along cross-sectional lines 9—9 in FIG. 3 and as has been discussed above.

Figure 10:
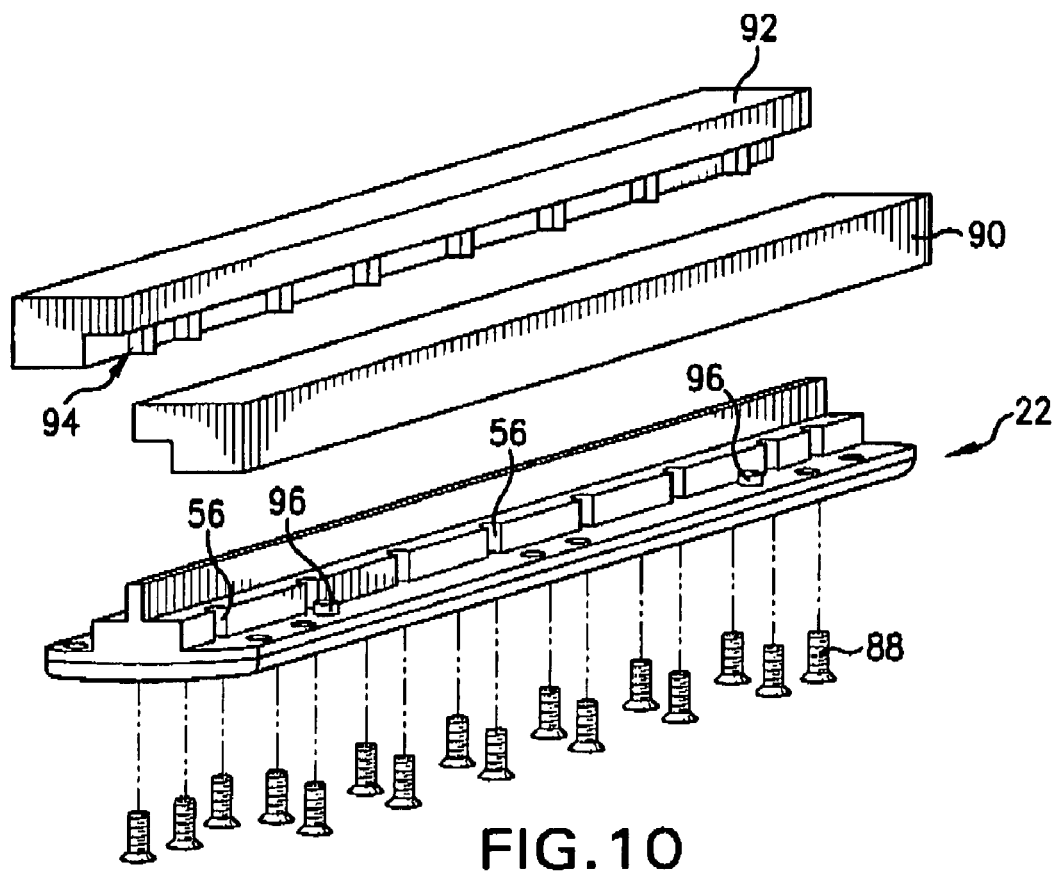
FIG. 10 illustrates aspects of an assembly and manufacturing process for an electrode assembly according to aspects of embodiments of the present invention.

Turning now to FIG. 10 there is illustrated aspects of an assembly and manufacturing process for an electrode assembly according to aspects of embodiments of the present invention. As can be seen from FIG. 10, the blanks 90, 92 for side portions 24, 26 may be mechanically bonded to the center base portion by, e.g., inserting bolts 80 through the bolt holes 57 in the lower center base portion 30 and into bolt sleeves 94 formed in the side walls of the blanks 90, 92 adjoining the side walls of the intermediate portions 32 of the center base portion 30, which are aligned with the bolt nooks 56. also shown in FIG. 10 are a plurality of alignment dowels 95 inserted into alignment dowel holes in the center base portion 22 and fit into corresponding sleeves on the blanks 90, 92, for alignment of the blanks 90, 92 with the center base portion 22.

Figure 11:
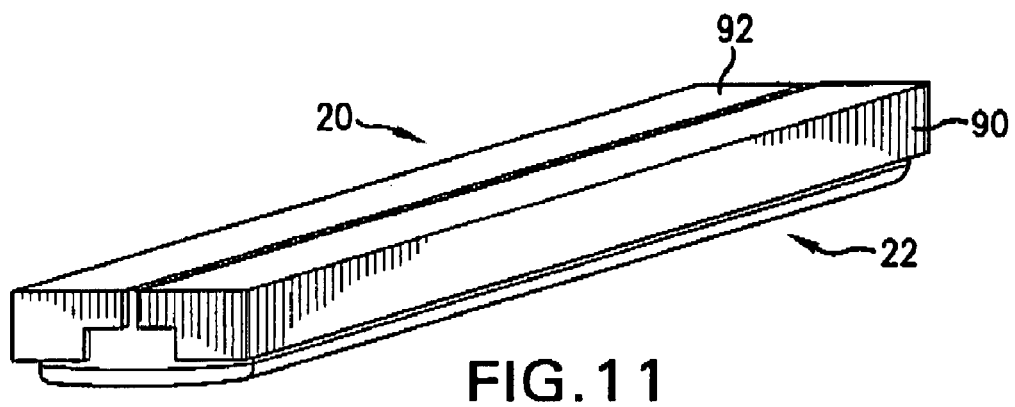
FIG. 11 illustrates aspects of an assembly and manufacturing process for an electrode assembly according to aspects of an embodiment of the present invention.

Turning now to FIG. 11 there is illustrated aspects of an assembly and manufacturing process for an electrode assembly 20 according to aspects of an embodiment of the present invention as discussed also in regard to FIG. 10 with the blanks 90 and 92 in place prior to machining the final shape of the electrode formed by the electrode assembly 20.

Figure 12:
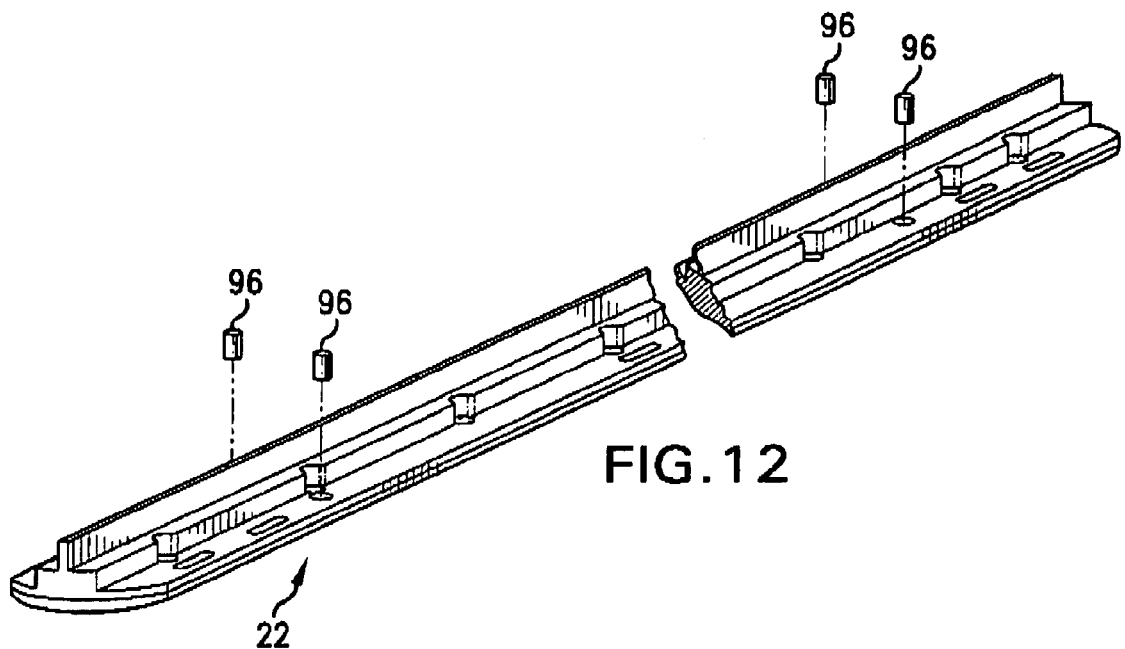
FIG. 12 illustrates aspects of an assembly and manufacturing process according to aspects of an embodiment of the present invention.

Turning now to FIG. 12 there is illustrated aspects of an assembly and manufacturing process according to aspects of an embodiment of the present invention. FIG. 12 shows the placement of the alignment dowels 96.

Figure 13:
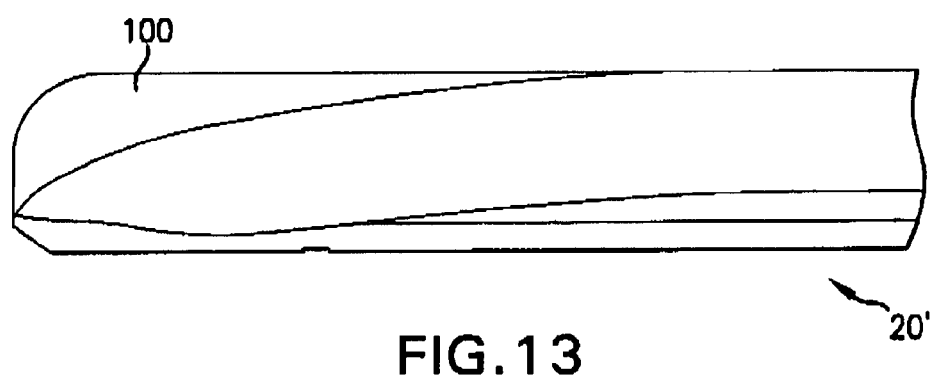
FIG. 13 illustrates a perspective side view of an electrode assembly according to aspects of an embodiment of the present invention.
Figure 14:
FIG. 14 shows an isometric perspective view of an electrode assembly according to aspects of an embodiment of the present invention.

Turning now to FIG. 13 there is illustrated a perspective side view of an electrode assembly according to aspects of an embodiment of the present invention. In the embodiment of FIG. 13, also shown in FIG. 14, the center base portion 22 upper portion 34, intermediate portion 32 and lower portion 30 and the side portions 24, 26 may be machined somewhat differently to form a hood 100 by rolling off the side portions 24, 26, and the intermediate portion 32 and lower portion 30 of the center base portion 22, but leaving the upper portion 34 of the center base portion 22 substantially intact and machine side walls for the upper base portion 34 into the intermediate portion 32 and lower portion 30 toward the very end of the electrode assembly 20' to form a substantially sharper roll off beginning at about location 106 to a substantially vertical end wall section 104. In this embodiment, the discharge widening at the longitudinal end of the discharge on the electrode 20' cannot occur because of the sharp drop off of the side walls at the end of the discharge, e.g., in about region 106. It will be understood that the embodiment of FIGS. 13 and 14 may be machined from a single piece of material or a single piece of diffusion bonded material of a plurality of different bonded materials. FIG. 14 shows an isometric perspective view of the electrode 20' according to aspects of an embodiment of the present invention just described.

Figure 16:
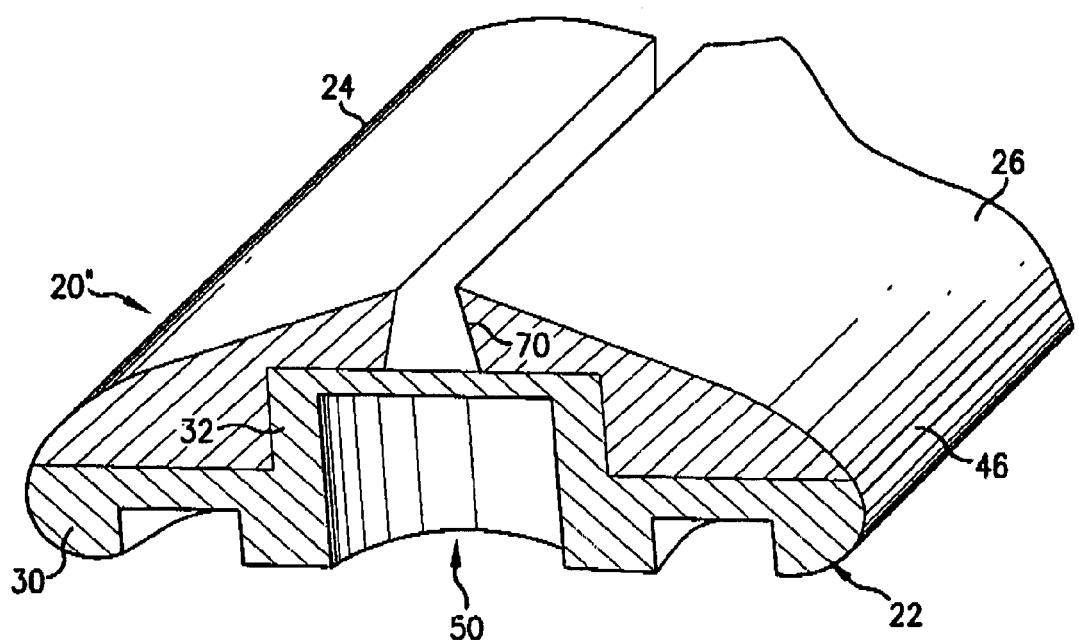
FIG. 16 shows a perspective view with cross-section of an electrode assembly according to aspects of an embodiment of the present invention.
Figure 15:
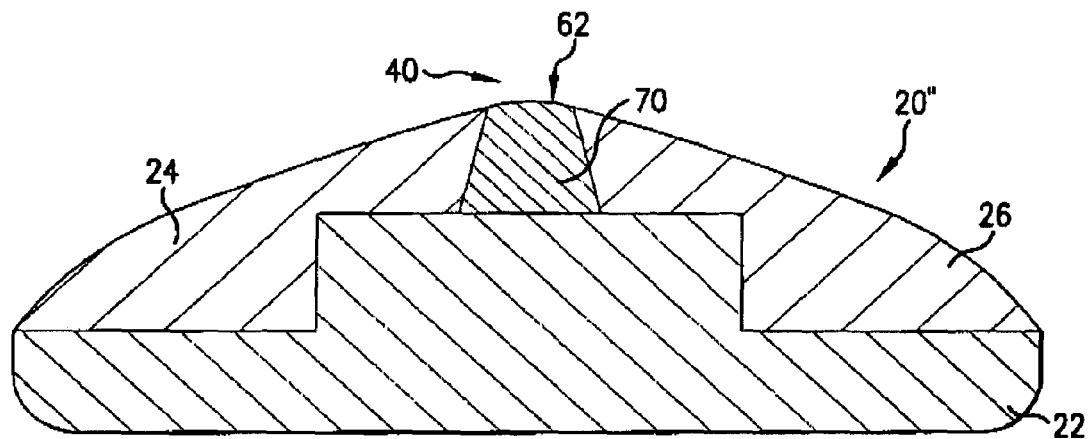
FIG. 15 shown a cross sectional view of an electrode assembly according to aspects of an embodiment of the present invention.

Turning now to FIG. 15 there is shown a cross sectional view of an electrode assembly 20" according to aspects of an embodiment of the present invention as also illustrated in FIG. 16, which shows a perspective view with cross-section of an electrode assembly 20" according to aspects of an embodiment of the present invention. As is shown in FIGS. 15 and 16, the center base portion 22 may have a lower portion 30 and an intermediate portion 32 only. The upper portion may be replaced, e.g., with a mechanically bonded electrode 70, with the center base portion acting as a support bar. Thus the overall assembly 20" for an electrode used as a cathode is much like existing anode assemblies with a blade electrode mechanically mounted or mechanically bonded to an anode support bar as is known in the art. In this embodiment, the side portions 24, 26 may be made, e.g., of a suitable dielectric, e.g., ceramic. In this embodiment, and particularly when machined, e.g., according to the embodiments illustrated in FIG. 15, the facing surface 62 may be broadened to substantially include all of the width of the discharge receiving region 40, such that the hood region 100 as illustrated in FIGS. 13 and 14, will be wide enough to extend the longitudinal extent of the discharge along the hood region sufficiently far to avoid electrode discharge region widening at the end of the discharge which was believed by applicants to be at least a part of the cause of end of life for prior art gas discharge laser light source electrodes.

Figure 17:
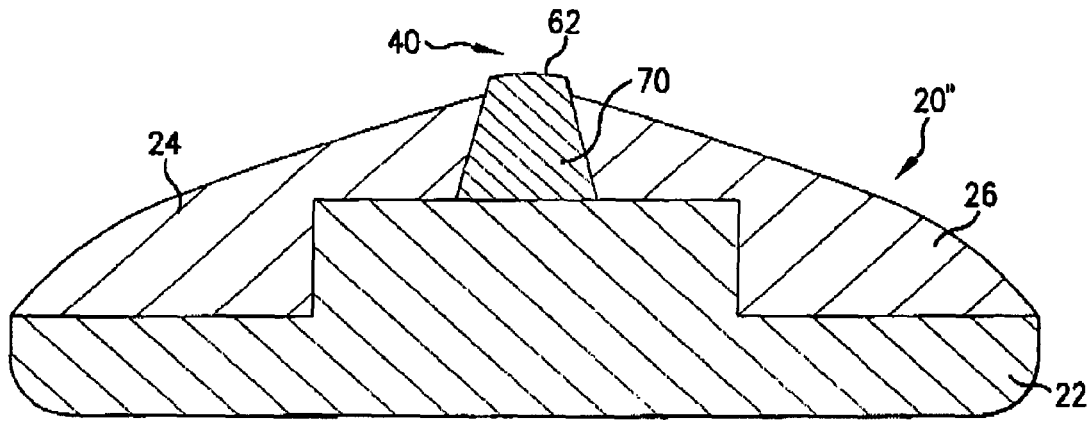
FIG. 17 shows a cross sectional view of a portion of an electrode assembly according to aspects of an embodiment of the present invention.

Turning now to FIG. 17, a further embodiment of the present invention is shown, schematically and not necessarily to proper scale, in which the electrode 70 is not formed to relatively smoothly join with the upper surfaces of the side portion 24, 26, whether they be formed of conductive metal or insulator, e.g., ceramic, such that the electrode 70 and its discharge receiving region 40 coextensive with its facing accurate surface (ellipsoidal, oval, circular arc, etc.) 62 extends above the elevation of the surfaces of the side portions 24, 26 and protrudes above the elevation of the surfaces of the side portions 24, 26. The electrode 70, so mounted on an electrode support bar, similarly to electrode support bar 201 as shown in FIG. 18, can be separately replaced and the remaining portions of the assembly utilized again after end of electrode life.

In operation, therefore, according to various aspects of embodiments of the present invention the embodiments involving multiple pieces will serve to provide several advantages over prior art electrodes for gas discharge laser light source laser systems for carrying the electrical discharges in the lasing gas medium. The mechanically bonded electrode is cheaper to initially manufacture, involving initially, e.g., no diffusion bonding to obtain, e.g., the differential erosion discussed in above referenced applications and patents. In addition, the embodiments with the electrode mechanically bonded to an electrode center base portion involve cost savings at end of life, as noted, with the need to dispose only of the electrode portion, e.g., 70 as shown in FIGS. 15 and 17. This same version of an electrode, e.g., with ceramic fairings as the side members and a protruding electrode, e.g., 70, can be sustained in operation for many billions of pulses of laser operation above and beyond the electrodes, e.g., cathodes, of the prior art. Similarly the hooded versions discussed above also can serve to increase the electrode life for many billions of pulses due to elimination of end-wear end of life syndrome discussed above and when combined with the aspects just described for the lifetime advantages of the protruding electrode and the mechanical bonding of the electrode to the central base portion have the combined beneficial effects of longer life and lower cost.

Turning now to FIGS. 18 and 19–19A there is shown a cross-sectional view of a portion of the interior of a fluorine gas discharge laser chamber containing an anode 200 mounted on an anode mounting bar 201. The anode 200 comprises an anode blade 202, which forms the electrically conductive portion (electrode) of the anode 200. The anode blade 202 is abutted on the upstream side (in relation to gas flow from left to right as shown in FIG. 18 over the anode 200) by an upstream fairing 204 and on the downstream side by a downstream fairing 206. The upstream fairing 204 and the downstream fairing 206 may be constructed of insulating material, e.g., ceramic insulating material.

As can be seen in more detail in FIGS. 19 and 19a, the surfaces of the upstream fairing 204 and the downstream fairing 206 may be essentially covered by a plurality of indentations, e.g., dimples 210. The dimples 210 may be arranged in a number of ways, either uniformly over the entire upper surface 214 of the upstream fairing 204 and/or the upper surface 216 of the downstream fairing 206. The dimples 210 may be uniform in depth or have randomly selected depths. The dimples 210 may be non-uniform in distribution, but uniform in clusters, e.g., with randomly distributed clusters. They may be generally abutting, e.g., in the nature of the cover of a golf ball or be separated by (surrounded by) non-dimpled regions. The dimples 210 may be of uniform shape, e.g., circular, polygonal of the same number of sides, etc., or may be randomly shaped and may be in either event of the same general size or randomly sized.

The dimples 210 serve, e.g., to remove, e.g., wavefront uniformities in, e.g., acoustic/shock waves, e.g., created by the periodic discharging of the laser gas between the gas discharge electrodes within the chamber in an effort to mitigate against BW resonances and center wavelength resonances over the range of operating gas discharge pulse repetition rates. The dimples will serve to break up the reflection of the acoustic/shock waves initially upon striking the respective upstream fairing upper surface 214 and downstream fairing upper surface 216, and subsequent reverberations will similarly tend to be broken up when reflecting off of the surfaces 214, 216, adding to BW resonance and center wavelength resonance mitigation efforts. The dimples 210 may also serve as a drag reducing instrument to trip the boundary layer to turbulence, thereby delaying the separation across the surface of the anode and reducing the drag downstream of the anode surface, e.g., in the pressure recovery area, much the same way that dimples on a golf ball improve the way that the golf ball moves through a fluid, the air around it. In this case, however, the anode and fairings 214, 216 and dimples 210 are stationary and the fluid, the laser gas, is flowing past the dimples 210. Such dimples may also be placed in the chamber in other locations, e.g., on the chamber walls. main insulator or anode support bar.

The various embodiments of the present invention disclosed in the present applications according to aspects of those embodiments comprise elongated discharge regions extending essentially along the longitudinal centerline axis of the electrode, whether that be a mechanically bonded version with metallic side portions, i.e., having an arcuate facing region, e.g., an essentially elliptical facing discharge receiving region extending also into the side portions adjoining the center electrode portion or only the curvilinear facing portion of the electrode with adjoining ceramic side portions, which may extend above the adjoining ceramic side portions as opposed to relatively smoothly blending into the surface contour of the respective side portions. Some part or all of the facing region, depending on aspects of the embodiments of the present invention disclosed in the present application may coincide with the discharge receiving region, with the discharge receiving region generally defining the transverse extent of the discharge between the electrodes in the lasing medium between the electrodes, as is understood in the art. This discharge receiving region may also extend longitudinally along the respective facing surface of the electrode, but not necessarily aligned with or coextensive with the longitudinal centerline axis of the electrode and/or electrode assembly, i.e., simply defining a raised facing region of the electrode coinciding with the discharge formed between the electrodes. Discharge receiving region as used in the application should be interpreted to include such aspects of embodiments of the present invention disclosed in the present application.

Applicants have discovered that an essentially bandwidth resonance-free laser performance can be attained by canting the elongated gas discharge cathode and the elongated gas discharge anode (at least with respect to acoustically generated resonances at particular repetition rates. By this is meant, e.g., for a standard ArF elongated gas discharge electrode, serving e.g., as the elongated gas discharge cathode, having, e.g., its gas discharge receiving region, which forms a somewhat pointed area and is contained within the discharge receiving region for the elongated gas discharge cathode, machined at an angle relative to the longitudinal axis of the elongated gas discharge cathode and, e.g., the longitudinal centerline axis of a main insulator. This angle is such that the gas discharge crown, longitudinally centered along the discharge receiving region intersects the gas discharge electrode longitudinal center axis of the elongated gas discharge electrode generally on the longitudinal centerline axis of the elongated gas discharge electrode. The ends of the gas discharge crown at the respective rounded ends of the electrode assembly are approximately 2 mm displaced from the longitudinal centerline axis, which has been selected based upon the width of one half of the gas discharge region, but could, as noted below, be selected otherwise within the scope of the present invention. The elongated gas discharge anode may also be machined in the same fashion as the elongated gas discharge electrode', however, in the mirror image so both crowns align with each other when installed. Alternatively the elongated gas discharge anode may simply be pivoted about its center to rotate the gas discharge crown (centered on the longitudinal gas discharge receiving region, of the elongated gas discharge anode to align the discharge receiving region of the elongated gas discharge anode with that of the canted gas discharge crown 74 machined on the elongated cathode. In such an embodiment, e.g., the anode fairings on either side of the anode blade discharge receiving region of a blade anode or hour-glass anode) may also be so rotated. Similarly, the chamber could be modified to receive the entire cathode and main insulator structure and also the anode mount structure canted to, e.g., the centerline axis of the chamber, i.e., for a rectangular chamber, which would then cant the discharge region also to the centerline axis of the chamber. In this manner the gas discharge region is canted or tilted to the normal longitudinal and optical axis of the previously constructed gas discharge laser chambers resulting in the substantial reduction in, e.g., BW resonance peaks up to and beyond 6000 Hz and specifically between about 3500 HZ and 6000 Hz.

It will also be understood that according to aspects of an embodiment of the present invention, in operation the two elongated electrode elements defining a cathode and an anode may each have an elongated discharge receiving region having a discharge receiving region width defining a width and length, with the length ordinarily extending to approximately where the roll off of the electrode assembly occurs as shown in, e.g., FIGS. 3, 4, 6 and 8. This length may be extended, as noted above avoiding electrode end-wear life-shortening erosion, e.g., as is shown in FIGS. 13 and 14, e.g., by the discharge receiving length in at least one of the electrode elements extending beyond a point of roll-off of the respective electrode element facing region by forming a hooded extension of the respective discharge receiving region above the roll-off portion of the electrode assembly. This may comprise the extension as well as the corresponding center portion of the electrode forming both the facing region and the discharge receiving region for the electrode assembly so that, e.g., the discharge receiving region extends out along the hooded region to substantially the end of the electrode assembly where the hooded region falls off relatively precipitously and there is no facing portion of the electrode assembly on either side of the discharge receiving region into which the discharge can transversely migrate at end of life, thereby undesirably widening the discharge receiving region at the respective electrode end due to the height of the hooded portion of the electrode assembly at the end of the hooded portion.

It will be understood by those skilled in the art that many changes and modifications may be made to the aspects of the embodiments of the invention as disclosed above without changing the spirit and scope of the appended claims and that the claims should not be limited to the aspects of the embodiments disclosed in the present application. For example, other smoothed curvilinear surfaces than ellipses may be employed, e.g., ovals and circular arcs, to define, e.g., the facing surfaces and/or discharge receiving regions noted above. Mechanical bonding can include a variety of detachable joinder mechanism such as bolts, screws, made of metal or ceramic or other insulating material, dovetail, mortice and tenon and the like joints, etc. In addition the detachable cathode having slanted side walls can simply be inserted into the slot formed by the adjoining metallic or insulative side portions as shown, e.g., in FIG. 16 and, e.g., held in place by set screws within the slot longitudinally, e.g., at both ends of the cathode member, and mechanically bonded as used in this application should be considered to cover all of such mechanical bonding and joining embodiments and equivalents. In addition brass alloys may be substituted for by nickel or nickel alloys.

The claims of the above application, therefore, should not be considered to be limited to aspects of preferred embodiments disclosed in this application but should be interpreted solely based upon the appended claims.

We claim:

1. A gas discharge laser comprising:
   A) a laser chamber containing a laser gas, the laser gas comprising a halogen,
   B) two elongated electrode elements defining a cathode and an anode, each of the cathode and anode having an elongated discharge receiving region having a discharge receiving region width defining a width of an electric discharge between the electrode elements in the laser gas, the discharge receiving region defining two longitudinal edges, and the anode comprising:
   a) a first elongated anode portion comprising a first anode material defining a first anode material erosion rate, located entirely within the discharge receiving region of the anode,
   b) a pair of second elongated anode portions comprising a second anode material defining a second anode material erosion rate, respectively located on each side of the first anode portion and at least partially within the discharge receiving region;

c). an elongated electrode center base portion integral with the first elongated anode portion; and wherein each of the respective pair of second elongated anode portions is mechanically bonded to the center base portion.

2. A apparatus of claim 1 further comprising:
the first anode material comprises a first brass alloy and the second anode material comprise a second brass alloy.

3. The apparatus of claim 1 further comprising:
the first anode material comprises a brass alloy containing at least 1 percent lead.

4. The apparatus of claim 2 further comprising:
the first anode material comprises a brass alloy containing at least 1 percent lead.

5. The apparatus of claim 1 further comprising:
the first anode material comprises a brass containing at least 3 percent lead.

6. The apparatus of claim 2 further comprising:
the first anode material comprises a brass containing at least 3 percent lead.

7. The apparatus of claim 1 further comprising:
the first anode material comprises C36000 brass and the second anode material comprise C26000 brass.

8. The apparatus of claim 2 further comprising:
the first anode material comprises C36000 brass and the second anode material comprise C26000 brass.

9. The apparatus of claim 3 further comprising:
the first anode material comprises C36000 brass and the second anode material comprise C26000 brass.

10. The apparatus of claim 4 further comprising:
the first anode material comprises C36000 brass and the second anode material comprise C26000 brass.

11. The apparatus of claim 5 further comprising:
the first anode material comprises C36000 brass and the second anode material comprise C26000 brass.

12. The apparatus of claim 6 further comprising:
the first anode material comprises C36000 brass and the second anode material comprise C26000 brass.

13. The apparatus of claim 1 further comprising:
the anode comprises a discharge receiving region of about 3.5 mm along a longitudinal centerline axis of the first anode portion with a sharp decrease in the electric field on both sides of the discharge receiving region.

14. A gas discharge laser comprising:
A) a laser chamber containing a laser gas, the laser gas comprising a halogen,
B) two elongated electrode elements defining a cathode and an anode, each of the cathode and anode having an elongated discharge receiving region having a discharge receiving region width defining a width of an electric discharge between the electrode elements in the laser gas, the discharge region defining two longitudinal edges, and the cathode comprising:
1) a first elongated cathode portion comprising a first cathode material defining a first cathode material erosion rate, located entirely within the discharge receiving region of the cathode,
2) a pair of second elongated cathode portions comprising a second cathode material defining a second cathode material erosion rate, respectively located on each side of the first cathode portion and at least partially within the discharge receiving region;
3. an elongated electrode center base portion integral with the first elongated cathode portion; and wherein each of the respective pair of second elongated cathode portions is mechanically bonded to the center base portion.

15. A apparatus of claim 14 further comprising:
the first cathode material comprises a second brass alloy and the second cathode material comprise a first brass alloy.

16. The apparatus of claim 14 further comprising:
the second cathode material comprise a brass alloy containing at least 1 percent lead.

17. The apparatus of claim 15 further comprising:
the second cathode material comprise a brass alloy containing at least 1 percent lead.

18. The apparatus of claim 14 further comprising:
the second cathode material comprise a brass containing at least 3 percent lead.

19. The apparatus of claim 15 further comprising:
the second cathode material comprise a brass containing at least 3 percent lead.

20. The apparatus of claim 14 further comprising:
the first cathode material comprises C26000 brass and the second cathode material comprise C36000 brass.

21. The apparatus of claim 15 further comprising:
the first cathode material comprises C26000 brass and the second cathode material comprises C36000 brass.

22. The apparatus of claim 16 further comprising:
the first cathode material comprises C26000 brass and the second cathode material comprise C36000 brass.

23. The apparatus of claim 17 further comprising:
the first cathode material comprises C26000 brass and the second cathode material comprise C36000 brass.

24. The apparatus of claim 18 further comprising:
the first cathode material comprises C26000 brass and the second cathode material comprise C36000 brass.

25. The apparatus of claim 19 further comprising:
the first cathode material comprises C26000 brass and the second cathode material comprise C36000 brass.

26. The apparatus of claim 14 further comprising:
the cathode comprises a discharge region of about 3.5 mm along a longitudinal centerline axis of the first cathode portion with a sharp decrease in the electric field on both sides of the discharge region.

27. The apparatus of claim 14 further comprising:
the first cathode material is annealed to a greater extent than the second cathode material.

28. The apparatus of claim 14 further comprising:
the first cathode material erosion rate is at least four times the second cathode material erosion rate.

29. The apparatus of claim 14 further comprising:
the first cathode material erosion rate is at least ten times the second cathode material erosion rate.

30. The apparatus of claim 1 further comprising:
the second anode material erosion rate is at least four times the first anode material erosion rate.

31. The apparatus of claim 1 further comprising:
the second anode material erosion rate is at least ten time the first anode material erosion rate.

32. A gas discharge laser comprising:
A) a laser chamber containing a laser gas, the laser gas comprising a halogen,
B) two elongated electrode elements defining a cathode and an anode, each of the cathode and anode having an elongated discharge receiving region having a discharge receiving region width defining a width of an electric discharge between the electrode elements in the laser gas, the discharge receiving region defining two longitudinal edges, and the cathode comprising:

a) a first elongated cathode portion comprising a first cathode material, located entirely within the discharge receiving region of the cathode, the first elongated cathode portion comprising a discharge receiving region facing the anode and comprising a first portion of an ellipse intersecting elongated side walls, with a bottom wall opposite the portion of the ellipse;

b) a pair of second elongated cathode side portions comprising a second cathode material, respectively located on each side of the first cathode portion and at least partially within the discharge receiving region, with the intersection of each respective second cathode portion and the portion of the ellipse forming the discharge receiving region of the first cathode portion, forming respective ellipsoidal extensions of the first portion of an ellipse, each ellipsoidal extension extending at least in part into the discharge region;

c. an elongated electrode assembly center base portion; and d. the first elongated cathode portion and the respective elongated second cathode portions being bonded to the elongated electrode assembly center base portion.

33. The apparatus of claim 32 further comprising:
the first elongated cathode portion and the respective elongated second cathode portions being mechanically bonded to the elongated center base portion.

34. The apparatus of claim 32 further comprising:
the first elongated cathode portion and the respective second elongated cathode portions being diffusion bonded to the elongated center base portion.

35. The apparatus of claim 34 further comprising:
the first elongated cathode portion and the respective second elongated cathode portions being diffusion bonded to the elongated center base portion and to each other.

36. The apparatus of claim 32 further comprising:
the second electrode portion material comprising an insulator.

37. The apparatus of claim 33 further comprising:
the second electrode portion material comprising an insulator.

38. The apparatus of claim 32 further comprising:
the first elongated cathode portion being diffusion bonded to the center base portion and the respective second elongated cathode portions being mechanically bonded to the center base portion.

39. The apparatus of claim 38 further comprising:
the second electrode portion material comprising an insulator.

40. A gas discharge laser comprising:
A) a laser chamber containing a laser gas, the laser gas comprising a halogen,
B) two elongated electrode elements defining a cathode and an anode, each of the cathode and anode having an elongated discharge receiving region having a discharge receiving region width defining a width of an electric discharge between the electrode elements in the laser gas, the discharge receiving region defining two longitudinal edges, and the cathode comprising:

a) a first elongated cathode portion comprising a first cathode material, located entirely within the discharge receiving region of the cathode, the first elongated cathode portion comprising a discharge receiving region facing the anode and comprising a portion of an ellipse intersecting elongated side walls, with a bottom wall opposite the portion of the ellipse;

b) a pair of second elongated cathode side portions comprising a second cathode material, respectively located on each side of the first cathode portion and not within the discharge receiving region, with the intersection of each respective second cathode portion and the portion of the ellipse being at an angle to the portion of the ellipse at the intersection point or the intersection point being on the elongated side walls;

c). an elongated electrode assembly center base portion; and d). the first elongated cathode portion and the respective elongated second cathode portions being bonded to the elongated electrode assembly center base portion.

41. The apparatus of claim 40 further comprising:
the first elongated cathode portion and the respective elongated second cathode portions being mechanically bonded to the elongated center base portion.

42. The apparatus of claim 40 further comprising:
the first elongated cathode portion and the respective second elongated cathode portions being diffusion bonded to the elongated center base portion.

43. The apparatus of claim 42 further comprising:
the first elongated cathode portion and the respective second elongated cathode portions being diffusion bonded to the elongated center base portion and to each other.

44. The apparatus of claim 40 further comprising:
the second cathode material is an insulator.

45. The apparatus of claim 41 further comprising:
the second cathode material is an insulator.

46. The apparatus of claim 40 further comprising:
the first elongated cathode portion being diffusion bonded to the center base portion and the respective second elongated cathode portions being mechanically bonded to the center base portion.

47. The apparatus of claim 46 further comprising:
the second electrode material is an insulator.

48. The apparatus of claim 1 further comprising:
the anode comprises a discharge receiving region extending longitudinally along the first anode portion defining a raised facing portion of the anode that is either not aligned with or not coextensive with the longitudinal centerline axis of the anode, or both, with a sharp decrease in the electric field on both sides of the discharge receiving region.

49. The apparatus of claim 14 further comprising:
the cathode comprises a discharge receiving region extending longitudinally along the first cathode portion defining a raised facing portion of the cathode that is either not aligned with or not coextensive with the longitudinal centerline axis of the cathode, or both, with a sharp decrease in the electric field on both sides of the discharge region.

50. A gas discharge laser comprising:
A) a laser chamber containing a laser gas, the laser gas comprising a halogen,
B) an electrode assembly comprising two elongated electrode elements defining a cathode and an anode, each of the cathode and anode having an elongated discharge receiving region having a discharge receiving region width defining a width of electric discharges between the electrode elements in the laser gas, and a discharge receiving length defining a longitudinal length of electric discharges between the electrode elements;

the discharge receiving length in at least one of the electrode elements extending beyond a point of roll-off of the respective electrode element facing region formed by a hooded extension of the respective discharge receiving above the roll-off portion of the electrode assembly.

51. The apparatus of claim 50 further comprising:
the elongated discharge receiving region and the hooded extension region are formed on an upper portion of a center base portion of the electrode assembly; and
a pair of elongated electrode side portions bonded to the center base portion.

52. The apparatus of claim 51 further comprising:
the pair of elongated electrode side portions are mechanically bonded to the center base portion.

53. The apparatus of claim 50 further comprising:
the elongated discharge receiving region and the hooded extension region are formed on an electrode member bonded to a center base portion of the electrode assembly; and
a pair of elongated electrode side portions bonded to the center base portion.

54. The apparatus of claim 53 further comprising:
the electrode member is mechanically bonded to the center base portion.

55. The apparatus of claim 53 further comprising:
the pair of elongated electrode side members are mechanically bonded to the center base member.

56. The apparatus of claim 51 further comprising:
the upper portion of the center base portion of the electrode assembly has opposing slanted side walls.

57. The apparatus of claim 52 further comprising:
the upper portion of the center base portion of the electrode assembly has opposing slanted side walls.

58. The apparatus of claim 53 further comprising:
the electrode member has opposing slanted side walls.

59. The apparatus of claim 54 further comprising:
the electrode member has opposing slanted side walls.

60. The apparatus of claim 55 further comprising:
the electrode member has opposing slanted side walls.

61. The apparatus of claim 50 further comprising:
the pair of elongated electrode side portions comprise an insulator material.

62. The apparatus of claim 51 further comprising:
the pair of elongated electrode side portions comprise an insulator material.

63. The apparatus of claim 52 further comprising:
the pair of elongated electrode side portions comprise an insulator material.

64. The apparatus of claim 53 further comprising:
the pair of elongated electrode side portions comprise an insulator material.

65. The apparatus of claim 54 further comprising:
the pair of elongated electrode side portions comprise an insulator material.

66. The apparatus of claim 55 further comprising:
the pair of elongated electrode side portions comprise an insulator material.

67. The apparatus of claim 56 further comprising:
the pair of elongated electrode side portions comprise an insulator material.

68. The apparatus of claim 57 further comprising:
the pair of elongated electrode side portions comprise an insulator material.

69. The apparatus of claim 58 further comprising:
the pair of elongated electrode side portions comprise an insulator material.

70. The apparatus of claim 59 further comprising:
the pair of elongated electrode side portions comprise an insulator material.

71. The apparatus of claim 60 further comprising:
the pair of elongated electrode side portions comprise an insulator material.

72. A method of operating a gas discharge laser comprising:
A) utilizing a laser chamber containing a laser gas, the laser gas comprising a halogen,
B) providing two elongated electrode elements defining a cathode and an anode, each of the cathode and anode having an elongated discharge receiving region having a discharge receiving region width defining a width of an electric discharge between the electrode elements in the laser gas, the discharge receiving region defining two longitudinal edges, and the anode comprising:
a) a first elongated anode portion comprising a first anode material defining a first anode material erosion rate, located entirely within the discharge receiving region of the anode,
b) a pair of second elongated anode portions comprising a second anode material defining a second anode material erosion rate, respectively located on each side of the first anode portion and at least partially within the discharge receiving region;
c. an elongated electrode center base portion integral with the first elongated anode portion; and
mechanically bonding each of the respective pair of second elongated anode portions to the center base portion.

73. A method of operating a gas discharge laser comprising:
A) using a laser chamber containing a laser gas, the laser gas comprising a halogen,
B) providing two elongated electrode elements defining a cathode and an anode, each of the cathode and anode having an elongated discharge receiving region having a discharge receiving region width defining a width of an electric discharge between the electrode elements in the laser gas, the discharge region defining two longitudinal edges, and the cathode comprising:
1) a first elongated cathode portion comprising a first cathode material defining a first cathode material erosion rate, located entirely within the discharge receiving region of the cathode,
2) a pair of second elongated cathode portions comprising a second cathode material defining a second cathode material erosion rate, respectively located on each side of the first cathode portion and at least partially within the discharge receiving region;
3). an elongated electrode center base portion integral with the first elongated cathode portion; and
mechanically bonding each of the respective pair of second elongated cathode portions to the center base portion.

74. A method of operating a gas discharge laser comprising:
A) utilizing a laser chamber containing a laser gas, the laser gas comprising a halogen,
B) providing two elongated electrode elements defining a cathode and an anode, each of the cathode and anode having an elongated discharge receiving region having a discharge receiving region width defining a width of an electric discharge between the electrode elements in the laser gas, the discharge receiving region defining two longitudinal edges, and the cathode comprising:
1) a first elongated cathode portion comprising a first cathode material, located entirely within the discharge receiving region of the cathode, the first elongated cathode portion comprising a discharge receiving region facing the anode and comprising a first portion of an ellipse intersecting elongated side walls, with a bottom wall opposite the portion of the ellipse;

2) a pair of second elongated cathode side portions comprising a second cathode material, respectively located on each side of the first cathode portion and at least partially within the discharge receiving region, with the intersection of each respective second cathode portion and the portion of the ellipse forming the discharge receiving region of the first cathode portion, forming respective ellipsoidal extensions of the first portion of an ellipse, each ellipsoidal extension extending at least in part into the discharge region;

3. an elongated electrode assembly center base portion; and

C) bonding the first elongated cathode portion and the respective elongated second cathode portions to the elongated electrode assembly center base portion.

75. A method of operating gas discharge laser comprising:
A) utilizing a laser chamber containing a laser gas, the laser gas comprising a halogen,
B) providing two elongated electrode elements defining a cathode and an anode, each of the cathode and anode having an elongated discharge receiving region having a discharge receiving region width defining a width of an electric discharge between the electrode elements in the laser gas, the discharge receiving region defining two longitudinal edges, and the cathode comprising:
1) a first elongated cathode portion comprising a first cathode material, located entirely within the discharge receiving region of the cathode, the first elongated cathode portion comprising a discharge receiving region facing the anode and comprising a portion of an ellipse intersecting elongated side walls, with a bottom wall opposite the portion of the ellipse;
2) a pair of second elongated cathode side portions comprising a second cathode material, respectively located on each side of the first cathode portion and not within the discharge receiving region, with the intersection of each respective second cathode portion and the portion of the ellipse being at an angle to the portion of the ellipse at the intersection point or the intersection point being on the elongated side walls;
3) an elongated electrode assembly center base portion; and
C) bonding the first elongated cathode portion and the respective elongated second cathode portions to the elongated electrode assembly center base portion.

76. A method of operating a gas discharge laser comprising:
A) utilizing a laser chamber containing a laser gas, the laser gas comprising a halogen,
B) providing an electrode assembly comprising two elongated electrode elements defining a cathode and an anode, each of the cathode and anode having an elongated discharge receiving region having a discharge receiving region width defining a width of electric discharges between the electrode elements in the laser gas, and a discharge receiving length defining a longitudinal length of electric discharges between the electrode elements;

the discharge receiving length in at least one of the electrode elements extending beyond a point of roll-off of the respective electrode element facing region formed by a hooded extension of the respective discharge receiving above the roll-off portion of the electrode assembly.

77. A gas discharge laser comprising:
A) a laser chamber containing a laser gas, the laser gas comprising a halogen,
B) two elongated electrode elements defining a cathode and an anode, each of the cathode and anode having an elongated discharge receiving region having a discharge receiving region width defining a width of an electric discharge between the electrode elements in the laser gas, the discharge receiving region defining two longitudinal edges, and the anode comprising:
1) an elongated anode blade portion,
2) an elongated upstream anode fairing on the upstream side of the anode blade portion and an elongated downstream anode fairing on the downstream side of the anode blade portion at least one of the upstream fairing and downstream fairing having a cathode side face which is dimpled.

78. The apparatus of claim 1 further comprising, the first anode material comprises a brass alloy and the second anode material comprises a nickel alloy.

79. The apparatus of claim 1 further comprising:
the first anode material comprises a first nickel alloy and the second anode material comprises a second nickel alloy.

80. A gas discharge laser comprising:
A) a laser chamber containing a laser gas, the laser gas comprising a halogen,
B) two elongated electrode elements defining a cathode and an anode, each of the cathode and anode having an elongated discharge receiving region having a discharge receiving region width defining a width of an electric discharge between the electrode elements in the laser gas, the discharge region defining two longitudinal edges, and at lease one of the electrodes comprising:
an elongated electrode center base portion; and
an elongated electrode mechanically bonded to the center base portion and forming an arcuate discharge receiving region and a pair of slanted side walls;
at least one elongated base side portion mechanically bonded to the center base portion;
wherein the elongated electrode extends above the at least one elongated base side portion such that the surface of the at least one base side portion facing the opposing electrode intersects the respective slanting side wall of the electrode.

81. The apparatus of claim 80 further comprising:
the at least one elongated base side portion comprises an insulator.

82. The apparatus of claim 80 further comprising:
the at least one elongated side base portion comprises an electrically conductive material.

* * * * *